United States Patent
Malicki

(10) Patent No.: US 9,248,919 B2
(45) Date of Patent: Feb. 2, 2016

(54) CARRIAGE ASSEMBLY FOR AN AIRPLANE TRANSPORTING SYSTEM ON AN AIRPORT APRON

(71) Applicant: Slawomir Malicki, Magdalenka (PL)

(72) Inventor: Slawomir Malicki, Magdalenka (PL)

( * ) Notice: Subject to any disclaimer, the term of this patent is extended or adjusted under 35 U.S.C. 154(b) by 66 days.

(21) Appl. No.: 14/356,362

(22) PCT Filed: Nov. 7, 2012

(86) PCT No.: PCT/PL2012/000122
§ 371 (c)(1),
(2) Date: May 5, 2014

(87) PCT Pub. No.: WO2013/070102
PCT Pub. Date: May 16, 2013

(65) Prior Publication Data
US 2014/0318409 A1    Oct. 30, 2014

(30) Foreign Application Priority Data
Nov. 8, 2011  (PL) .................................. P 396922

(51) Int. Cl.
*B64F 1/00*    (2006.01)
*B64F 1/22*    (2006.01)
*B61B 5/02*    (2006.01)

(52) U.S. Cl.
CPC .. *B64F 1/22* (2013.01); *B61B 5/025* (2013.01)

(58) Field of Classification Search
CPC ............ B61F 1/22; B61F 1/227; B61F 1/228; B61F 1/04; B61B 5/025; B64C 39/024; B64C 2201/086; B64C 2201/187
See application file for complete search history.

(56) References Cited

U.S. PATENT DOCUMENTS

| | | | | |
|---|---|---|---|---|
| 554,445 | A * | 2/1896 | Holden | A63B 55/08 104/194 |
| 3,162,404 | A * | 12/1964 | Squire | B64F 1/00 244/114 R |
| 4,252,285 | A * | 2/1981 | Hammond | B64F 1/06 104/161 |
| 5,161,753 | A * | 11/1992 | Vice | B64F 5/0054 134/123 |
| 6,131,854 | A * | 10/2000 | Nicolai | B64C 39/024 244/114 R |
| 2012/0298797 | A1* | 11/2012 | Malicki | B64F 1/22 244/114 R |
| 2014/0318409 | A1* | 10/2014 | Malicki | B64F 1/22 105/26.05 |

FOREIGN PATENT DOCUMENTS

PL        390365 A1    8/2011
WO    2011096833 A2    8/2011

OTHER PUBLICATIONS

International Search Report for App. No. PCT/PL2012/000122 filed Nov. 7, 2012.

* cited by examiner

*Primary Examiner* — Jason C Smith
(74) *Attorney, Agent, or Firm* — Walker & Jocke

(57) ABSTRACT

The invention solves a problem of a carriage (1) assembly for an airplane transporting system on an airport apron, from a parking location to a runway and from a landing to the parking location with an airplane's engine off. The carriage assembly is formed by a guiding groove (3) with a rectangular cross-section, a floor (5) of which being provided with lower guide rails (6), and side walls (7) of which being provided with side guide rails (8), and the carriage (1) is constituted by a spatial structure (9), having a bottom part (10) and side parts (11), the carriage (1) being provided with a lower vehicle wheels set (12), fixed at the bottom part (10) of the carriage (1), and a side vehicle wheels set (13) fixed at both side parts (11) of the carriage (1).

15 Claims, 4 Drawing Sheets

CARRIAGE ASSEMBLY FOR AN AIRPLANE TRANSPORTING SYSTEM ON AN AIRPORT APRON

The present invention relates to a carriage assembly for an airplane transporting system on an airport apron, from a parking to a take-off location or from a landing to the parking location. The solution is applicable in aviation.

Till now airplanes have been transported on an airport apron, from a parking location to a runway or to the parking location after landing, under their own power, with the engines on.

An assembly for transporting airplane on an airport apron from a parking to a take-off location and from a landing to the parking location with an aeroplane's engine off is known from the Polish patent application No. 390365. According to the solution the assembly comprises docking stations made in a surface of access ways (taxiways) to a runway of the airport and connected with guiding grooves located along a route of an airplane movement to the parking location. In the docking stations there are mounted leading mandrels, which are preferably fastened to a front wheel of the airplane after bringing it to the docking station. From the main transport route there are branched off terminal transport routes. Guiding grooves which constitute them are covered from the top with pivotable gratings having a segmented structure. The pivotable gratings automatically open in front of the leading mandrel moving in the guiding groove. After passage of the leading mandrel, the pivotable gratings close. In places of the direction changes of the guiding grooves, in places of their abrupt curves and in junctions of the main transport route to the terminal transport route there are switching devices installed.

The objective of the solution according to the invention is the development of possibility to transport an airplane from a parking location to a runway or to leave the runway after landing and transport to the parking location without an engine set working. The objective of the solution is to develop a construction of an assembly that enables realization of this undertaking by the development of a carriage assembly which can move in a guiding groove.

Thanks to such a solution, an airplane will be lighter and more economical in operation.

According to the invention a carriage assembly is intended for an airplane transporting system on an airport apron, from a parking location to a runway and from a landing location to the parking location, wherein the airplane transporting system on the airport apron is constituted by guiding grooves. The leading mandrels installed in docking stations and latched to an airplane move in the guiding grooves, and guiding grooves are covered from the top with pivotable covers having a segmented structure.

The carriage assembly is formed by the guiding groove having a rectangular cross-section, a floor of which is provided with lower guide rails, and side walls of which are provided with side guide rails, and the carriage being a spatial structure. The structure of the carriage has its bottom part and side parts. The carriage is provided with a lower vehicle wheels set fixed at the bottom part of the carriage, and a side vehicle wheels set fixed at both side parts of the carriage.

Preferably, the lower guide rails are provided with a limiting element, placed between the vehicle wheels of the lower vehicle wheels set.

Also preferably, the side guide rails are provided with the limiting element at both sides of the guiding groove, placed between the vehicle wheels of the side vehicle wheels set.

Also preferably, the carriage in its upper part is provided with the leading mandrel, which mandrel preferably has a changeable height and is preferably provided with a latch.

Also preferably, the guiding groove is provided with pivotable gratings substantially along its entire length, having a segmented structure, which are being opened in front of the moving leading mandrel and are being closed behind the moving leading mandrel, and, preferably, the opening and closing of the guiding groove being realized by the leading mandrel.

The subject of the invention is presented in an embodiment in the attached drawings, in which FIG. 1 shows an airport apron with a guiding groove located on its surface, with covers of this groove being closed;

Figure 1:
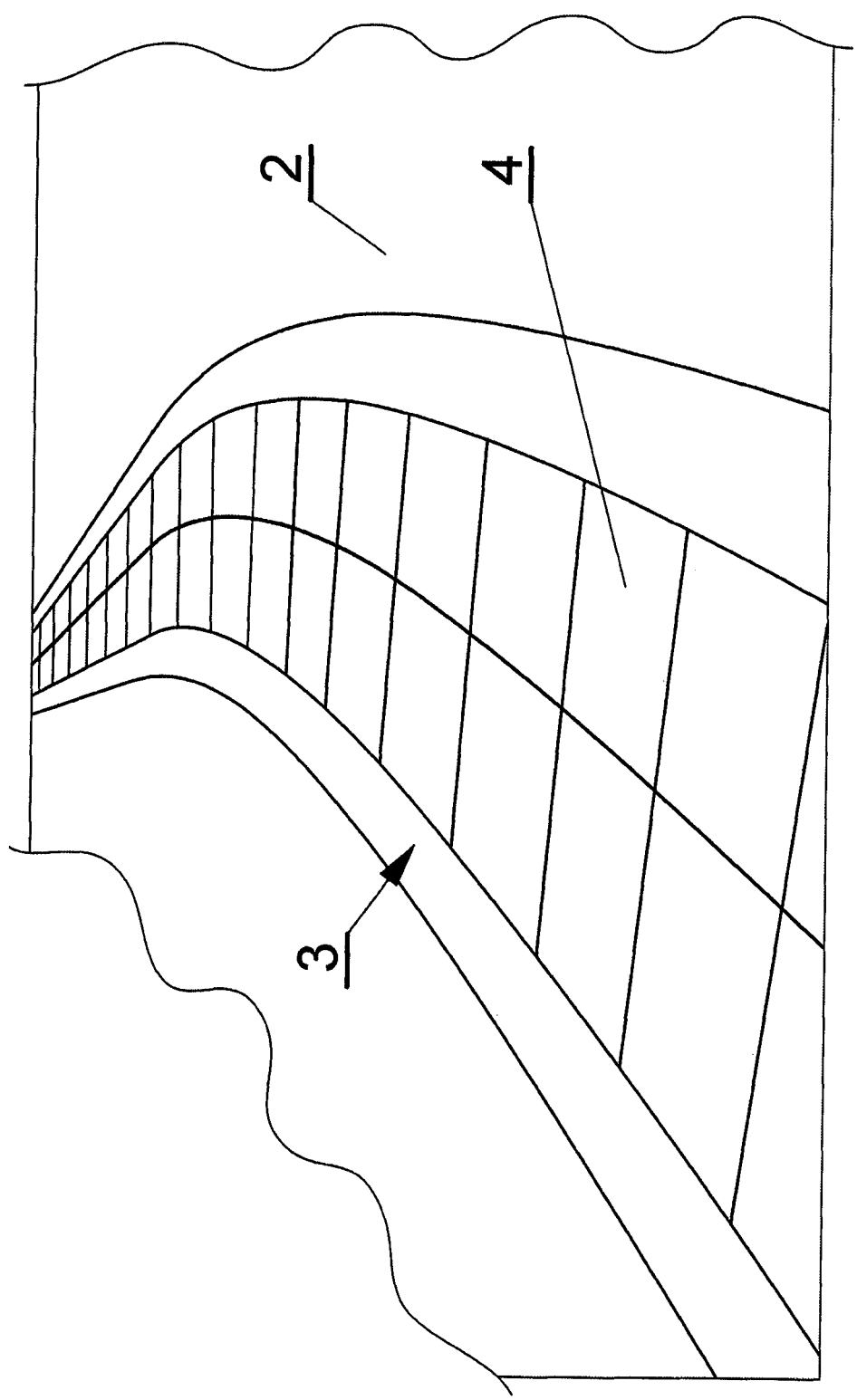

As it is shown in FIG. 1, the carriage 1 assembly for a system of moving airplanes on the airport apron 2, from a parking to a take-off location or from a landing to the parking location, moves in the guiding groove 3 made in the airport apron 2 and provided with the pivotable covers 4, closing the guiding groove 3 from the top.

Figure 3:
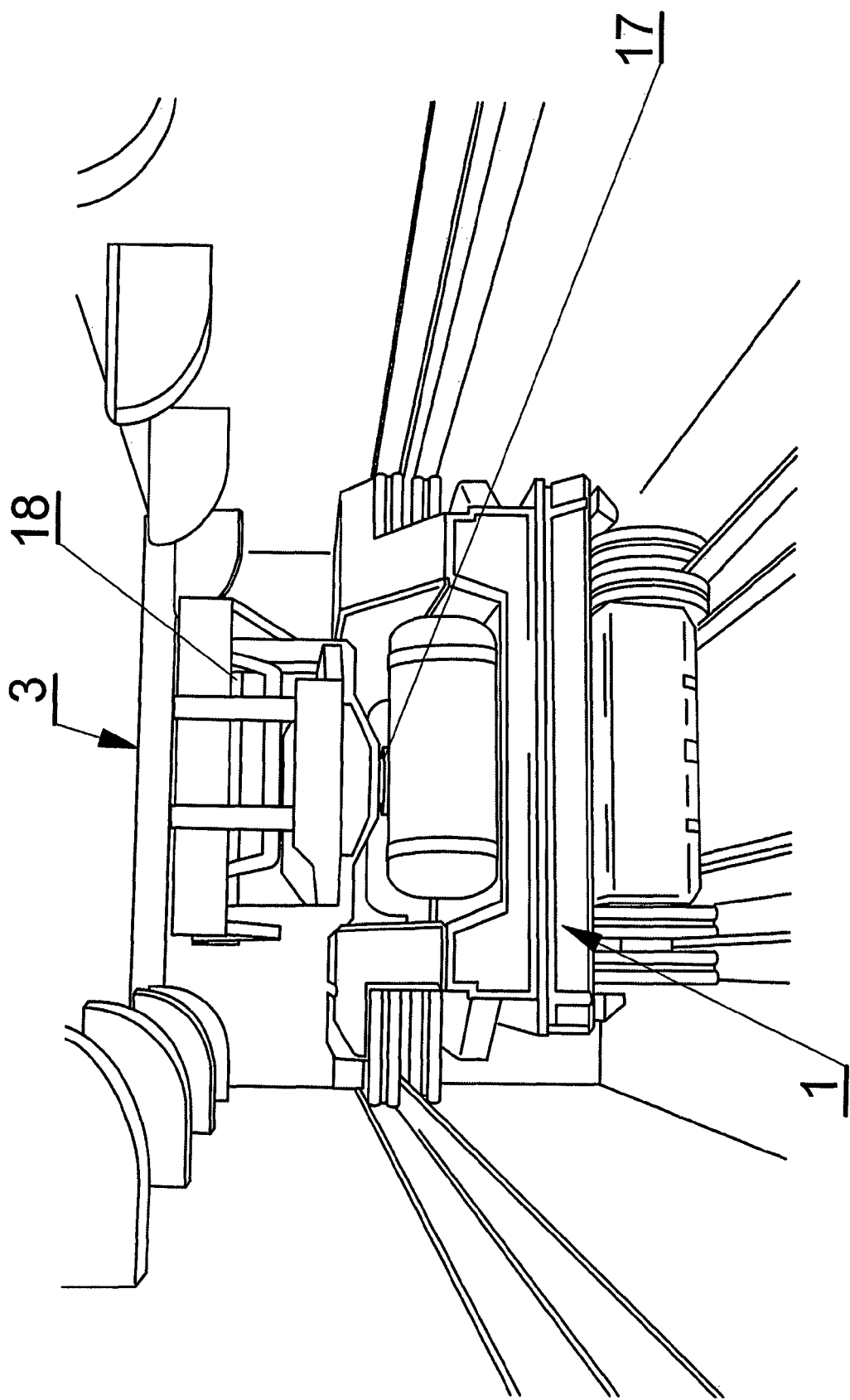
FIG. 3 shows the carriage in the guiding groove, with the leading mandrel.
Figure 4:
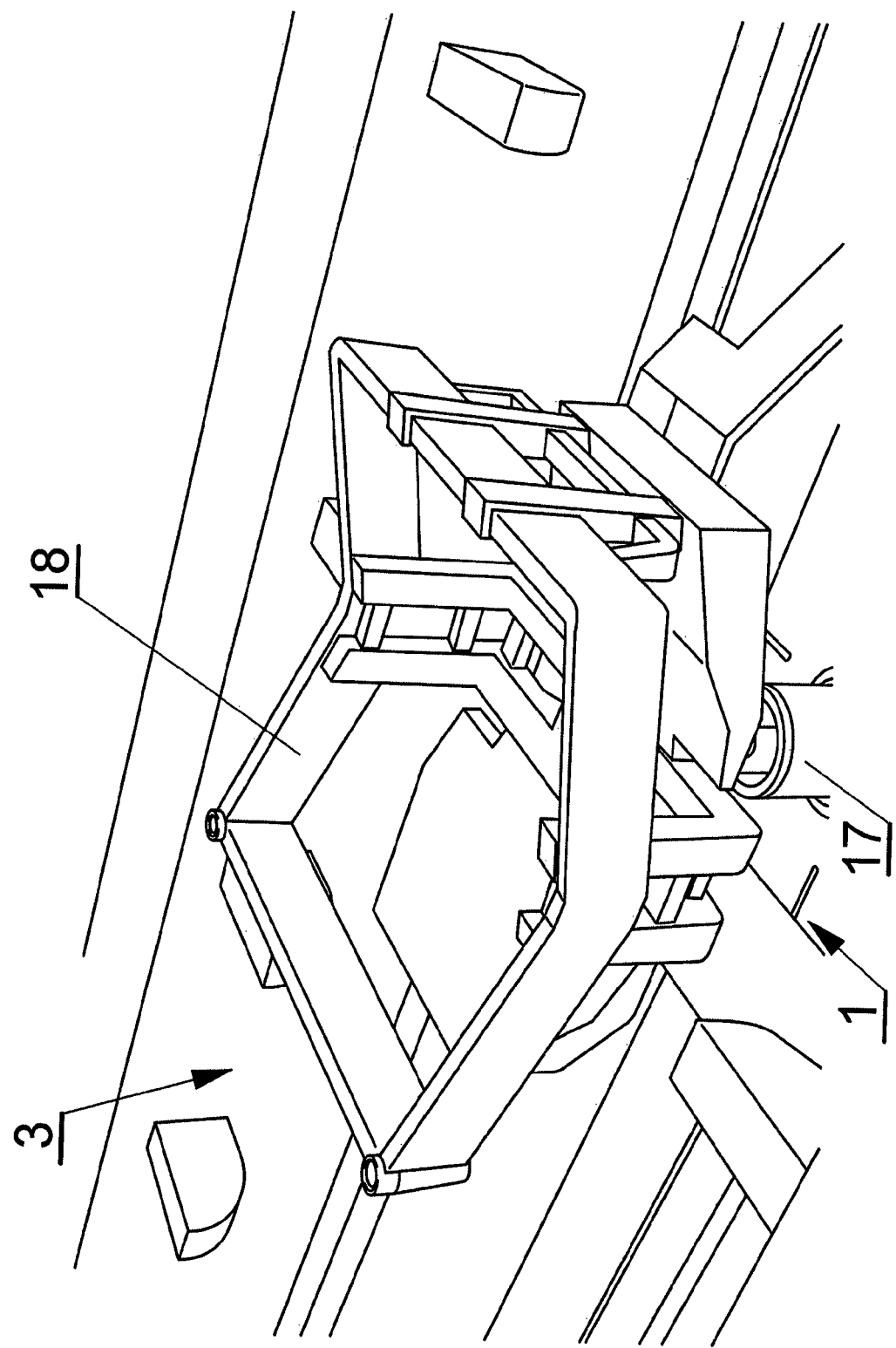
FIG. 4 shows the leading mandrel with latching elements during its movement out from the carriage.

The pivotable covers 4 close the guiding groove in which the carriage 1 moves, which carriage is equipped, which is seen in FIG. 3 and FIG. 4, with the leading mandrel 17 provided with a latch 18 for fastening to an undercarriage leg of an airplane transported on the airport apron 2.

The pivotable covers 4 have a segmented structure which allows opening the inside of the guiding groove 3 only within the area of the moving carriage 1 with the leading mandrel 17, wherein opening of the pivotable covers is triggered by the leading mandrel 17.

Figure 2:
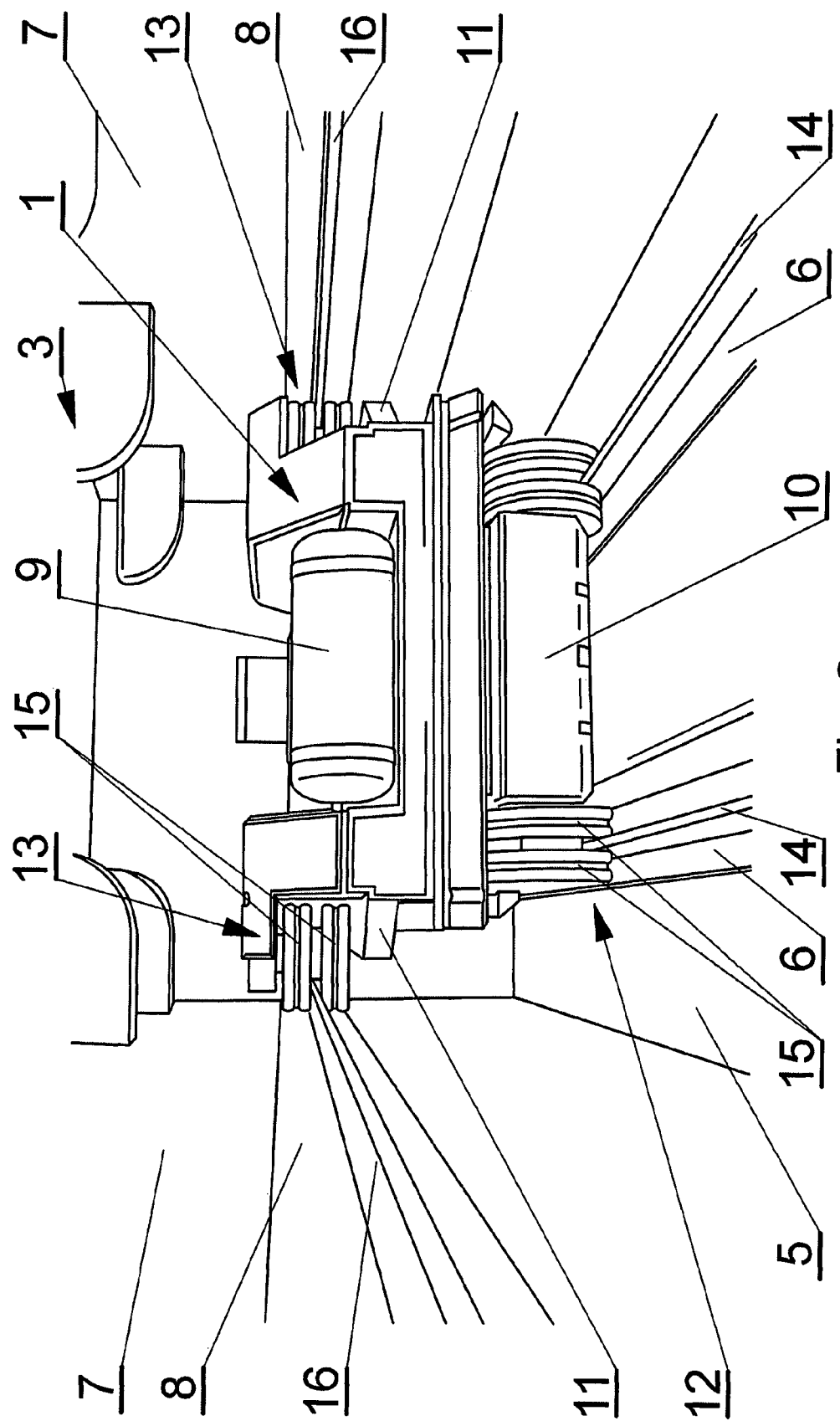
FIG. 2 shows a carriage in the guiding groove, without a leading mandrel.

As it is shown in FIG. 2 and FIG. 3, the carriage 1 assembly for the system of moving airplanes on the airport apron 2 from the parking location to a runway or from the landing to the parking location, is placed in the guiding groove 3. The guiding groove 3 has a rectangular cross-section and is limited with two side walls 7, which are parallel to each other, and a floor 5, connecting the side walls 7 at their bottom parts. The section of the guiding groove 3 is open from the top and is closed by the pivotable covers 4.

The floor 5 of the guiding groove 3 is provided with lower guide rails 6. Two lower guide rails 6 form a track. The side walls 7 of the guiding groove 3 are also provided with side guide rails 8 at some height from the floor, one side guide rail 8 being located on each side wall 7. The carriage 1 moves on the lower guide rails 7 and the side guide rails.

The carriage 1 is constituted by a spatial structure 9 having a bottom part 10 and side parts 11. The carriage 1 is provided with a lower vehicle wheels set 12, placed at the bottom part 10 of the carriage 1, engaged with the lower guide rails 6, and a side vehicle wheels set 13, fixed at both side parts 11, engaged with the side guide rails 8.

The lower guide rails 6 are constituted by T-shaped section with its flange facing the floor 5 of the guiding groove 3. The web of the T-shaped section of the lower guide rails 6 faces the inside of the guiding groove 3 in such a way that it defines a limiting element 14 of the lower guide rails 6. The lower vehicle wheels set 12 is provided with vehicle wheels 15 such that two vehicle wheels 15 are placed adjacent to each other on one side of the bottom part 10 of the carriage 1, in such a way that after placing the carriage 1 in the guiding groove 3 each wheel of this pair is located at the opposite side of the limiting element 14 of the lower guide rail 6. On the other side of the bottom side 10 of the carriage 1, the structure of the lower vehicle wheels set 12 is analogous. The lower vehicle wheels set 12 includes two pairs of the vehicle wheels 15 per each side.

The side guide rails 7 are also constituted by T-shaped section with its flange facing the side wall 7 of the guiding groove 3. The web of the T-shaped section of the side guide rails 7 faces the inside of the guiding groove 3 in such a way that it defines the limiting element 16 of the side guide rails 7. The side vehicle wheels set 13 is provided with the vehicle wheels 15 in such a way that two vehicle wheels 15 are placed adjacent to each other on one side of the side part 11 of the carriage 1, in such a way, that after putting the carriage 1 in the guiding groove 3 each wheel 15 of this pair is placed at the opposite side of the limiting element 16 of the side guide rail 7. The structure of the side vehicle wheels set 13 on the other side of the carriage 1, on the other side part 11 of the carriage 1, is analogous. The side vehicle wheels set 13 includes two pairs of the vehicle wheels 15 on each side part 11 of the carriage 1.

In this way the travelling carriage 1 is precisely and reliably guided in the guiding groove 3. The carriage 1 is provided with a driving mechanism (not shown) allowing to move the carriage 1 in the guiding groove 3 together with an airplane. To this end the travelling carriage 1 in its upper part is provided with the leading mandrel 17. The leading mandrel 17 is telescopically set on the carriage 1, on a hydraulic outrigger. It is provided with the latch 18 for fastening the airplane to the leading mandrel 17. Therefore, the carriage 1 can move in the guiding groove 3 with the airplane attached thereto and without the airplane as well. In the latter case the leading mandrel 17 is lowered and the whole carriage 1 together with the latch 18 is completely hidden in the guiding groove 3 such that the pivotable covers 4 can be closed during movement of the carriage 1.

In the case when the airplane is attached to the carriage 1 with the leading mandrel 17 and the latch 18, an automatic opening the pivotable covers 4 by the leading mandrel 17, with a lifting mechanism (not shown), takes place during movement of the carriage together with the airplane on the airport apron 2.

The airport apron 2 may be provided with a number of the guiding grooves 3 of this type, in which a number of the carriages 1 may move simultaneously either transporting the airplanes from the runway to the parking location and from the parking location to the runway on the airport apron 2, or without the load.

In such a case movement of the carriages 1 in the guiding grooves may be controlled by a central computer.

It is obvious that a person skilled in the art may without any additional inventive work in different ways modify and improve the set of the carriage 1 for the airplane transporting system on the airport apron 2 in the guiding groove 3, shown in the non-limiting embodiment, without departing from the scope of the claims.

The invention claimed is:

1. Apparatus comprising:
   a carriage of an airplane transporting system on an airport apron, wherein the airplane transporting system transports an airplane from a parking location to a runway location adjacent a runway and from a landing location to the parking location,
      wherein the airplane transporting system includes a guiding groove, which has a rectangular cross-section defined by an open top, a floor and a pair of opposed side walls,
      wherein the guiding groove includes at least one lower guide rail and at least two side guide rails, wherein the at least one lower guide rail is provided on the floor and at least one of the at least two side guide rails is provided on each respective side wall,
      wherein the airplane transporting system includes a plurality of movable pivotable covers, wherein the pivotable covers are operable to selectively cover the top of the guiding groove, wherein the pivotable covers have a segmented structure,
   the carriage comprising:
      a leading mandrel, wherein the leading mandrel is operable to be in releasibly latched operative engagement with the airplane;
      a spatial structure, wherein the spatial structure has a bottom part and a pair of opposed side parts,
      at least one bottom vehicle wheel, wherein the at least one bottom vehicle wheel extends at the bottom part;
      at least two side vehicle wheels, wherein at least one side vehicle wheel extends at each of the side parts; and
      wherein the carriage is movable in the guiding groove.

2. The apparatus according to claim 1,
   wherein the at least one lower guide rail includes at least one bottom limiting element,
   wherein the at least one bottom vehicle wheel includes a set having a pair of bottom vehicle bottom wheels, wherein the at least one bottom limiting element extends between the bottom vehicle wheels of the set in guiding relation during carriage movement.

3. The apparatus according to claim 1,
   wherein each respective side guide rail includes a respective side limiting element,
   wherein the at least one side vehicle wheel includes a set having a pair of side vehicle wheels, wherein a respective side limiting element extends between side vehicle wheels of a respective set in guiding relation during carriage movement.

4. The apparatus according to claim 3,
   wherein the at least one lower guide rail includes two bottom limiting elements, wherein the bottom limiting elements are disposed sideways from each other,
   wherein the at least one bottom vehicle wheel includes at least two sets of bottom vehicle wheels, each set having two bottom vehicle wheels, wherein one respective bottom limiting element extends between the bottom vehicle wheels of a respective set in guiding relation during carriage movement.

5. The apparatus according to claim 1, wherein the spatial structure includes an upper part generally opposite the bottom part, and wherein the leading mandrel extends on the upper part.

6. The apparatus according to claim 5, wherein the leading mandrel is selectively changeable in height, wherein with the mandrel extended upward and with at least one of the covers overlying the carriage moved to open the top, the carriage is movable in the groove in operative engagement with the airplane, and with the mandrel retracted downward and not in operative engagement with the airplane, the carriage is movable in the groove with the overlying covers closed.

7. The apparatus according to claim 5, wherein the carriage further includes a latch, wherein the latch is releasibly engageable in operative connection with the airplane and is in operative connection with the leading mandrel.

8. The apparatus according to claim 1, wherein the pivotable covers are located substantially along an entire length of the guiding groove, defining a segmented structure, wherein during carriage movement at least one cover ahead of the leading mandrel is opened and at least one cover behind the leading mandrel is closed.

9. The apparatus according to claim 8, wherein the leading mandrel is operative to open the covers of the guiding groove.

10. The apparatus according to claim 9, and further comprising the airplane transporting system, wherein the airplane transporting system transports the airplane from the parking location to the runway location and from the landing location to the parking location.

11. An airplane transporting system on an airport apron for transporting an airplane from a parking location to a runway location adjacent a runway, and from a landing location to the parking location, the transportation system comprising:
- a carriage, wherein the carriage comprises:
  - a leading mandrel, wherein the leading mandrel is configured to be in selectively latched operative engagement with the airplane,
  - a bottom part and a pair of opposed side parts,
  - at least one bottom vehicle wheel, wherein the at least one bottom vehicle wheel extends at the bottom part,
  - at least two side vehicle wheels, wherein at least one of the side vehicle wheels extends at a respective one of the side parts;
- a guiding groove, wherein the carriage is selectively movable in the guiding groove, wherein the guiding groove has a rectangular cross-section defined by an open top, a floor and a pair of disposed side walls;
- wherein the carriage is movably supported in guided engagement in the groove by operative engagement of the at least one bottom vehicle wheel and the floor and the at least two side vehicle wheels and the side walls;
- at least one lower guide rail, wherein the at least one lower guide rail is operatively supported by the floor and is guidably engageable with at least one bottom vehicle wheel;
- at least two side guide rails, wherein at least one side guide rail is operatively supported by each side wall and is guidably engageable with at least one side vehicle wheel; and
- a plurality of pivotable movable covers, wherein the covers are configured to cover the top of the guiding groove, wherein the covers have a segmented structure and are each separately movable relative to the other covers.

12. The airplane transporting system according to claim 11,
wherein each of the at least one lower guide rail includes a bottom limiting element, wherein the at least one bottom vehicle wheel includes a set having two bottom vehicle wheels, wherein the bottom limiting element extends between bottom vehicle wheels of the set of bottom vehicle wheels during carriage movement,
wherein the at least one side vehicle wheel extending from each side part includes a set having two side vehicle wheels, and
wherein each of the side guide rails includes a side limiting element, wherein each respective side limiting element extends between side vehicle wheels of a respective set of side vehicle wheels during carriage movement.

13. The airplane transporting system according to claim 11,
wherein the carriage includes an upper part, and wherein the leading mandrel extends on the upper part, and
wherein the leading mandrel has a selectively changeable height, wherein in an upward extended position the leading mandrel is operatively engageable with the airplane through the top of the guiding groove, and in a retracted position the carriage is movable in the guiding groove below closed covers.

14. The airplane transporting system according to claim 13, wherein the carriage further includes a latch, wherein the latch is in operative connection with the leading mandrel and is changeable in height therewith, wherein the latch is releasibly operatively engageable with the airplane when the mandrel is in the extended position.

15. The airplane transporting system according to claim 11, wherein the pivotable movable covers are located substantially along an entire length of the guiding groove, defining a segmented structure, wherein during carriage movement in operative engagement with the airplane, at least one cover ahead of the moving leading mandrel is open and at least one cover behind the moving leading mandrel is closed.

\* \* \* \* \*